United States Patent [19]

Stenz et al.

[11] Patent Number: 4,707,033
[45] Date of Patent: Nov. 17, 1987

[54] DEVICE FOR RELEASABLY CONNECTING A SEAT PORTION TO THE VEHICLE BODY

[75] Inventors: Karl Stenz, Wiesbaden; Horst Baltes, Florsheim, both of Fed. Rep. of Germany

[73] Assignee: General Motors Corporation, Detroit, Mich.

[21] Appl. No.: 882,964

[22] Filed: Jul. 7, 1986

[30] Foreign Application Priority Data

Jul. 30, 1985 [DE] Fed. Rep. of Germany ....... 3527246

[51] Int. Cl.⁴ ................................................. A47C 7/02
[52] U.S. Cl. ............................ 297/452; 292/DIG. 38; 24/616
[58] Field of Search ............... 297/440, 452, 243, 195; 296/63, 65 R; 24/616, 453, 297; 292/337, DIG. 38; 411/508, 509, 510

[56] References Cited

U.S. PATENT DOCUMENTS

| | | | |
|---|---|---|---|
| 2,520,725 | 8/1950 | Judd | 24/616 X |
| 3,350,764 | 11/1967 | Geldwerth | 24/616 X |
| 3,915,493 | 10/1975 | Brown | 297/452 X |
| 3,918,130 | 11/1975 | Poe | 24/453 |
| 3,924,892 | 12/1975 | Geier | 297/452 X |
| 4,157,797 | 6/1979 | Fox | 297/243 X |
| 4,284,299 | 8/1981 | Kelly | 292/DIG. 38 |
| 4,527,821 | 7/1985 | Tanaka | 292/DIG. 38 X |
| 4,583,782 | 4/1986 | Mikuniya | 297/452 X |

FOREIGN PATENT DOCUMENTS 3117643 11/1982 Fed. Rep. of Germany .

Primary Examiner—Peter A. Aschenbrenner
Attorney, Agent, or Firm—Charles E. Leahy

[57] ABSTRACT

In a seat portion, the wire frame is provided with two spaced apart downwardly directed U-shaped portions. Each of the U-shaped portions has secured thereto a locking assembly which is formed by two half-shell members and which includes a locking pawl. The locking pawl is actuated by a pull-type actuating member.

The seat portion is fastened into positiion in that the locking asemblies secured thereto are inserted into simple openings in the vehicle substructure for locking engagement therewith.

7 Claims, 8 Drawing Figures

DEVICE FOR RELEASABLY CONNECTING A SEAT PORTION TO THE VEHICLE BODY

The invention relates to a device for releasably connecting a seat portion with the vehicle body, and more particularly wherein the seat portion is provided with a handle-operated locking assembly and the vehicle body with a member for receiving the locking assembly.

BACKGROUND OF THE INVENTION

Devices of this type usually serve to releasably connect a seat portion of a rear seat with the substructure of the vehicle so that the seat portion can be removed from the vehicle easily and without any tools. It should be appreciated that such devices may also be provided for use with foldable seat cushions or back rests so as to lock these seat portions into their normal position.

In these prior art devices of the type described in DE-PS No. 31 17 643, the latching element is a rod-like portion which is part of the wire frame of the rear seat. The recipient member is a locking assembly of complex structure which is fastened to the vehicle substructure and which comprises a locking pawl. When the seat portion is inserted to the locking position, the locking pawl engages the rod-like portion of the wire frame. The locking pawl can be moved by a pull-type actuating member into a release position. A recipient member of this type is relatively expensive to manufacture, because it is comprised of several components which must be individually manufactured and assembled. Furthermore, prior to installation of the rear seat, the recipient member must be bolted to the vehicle substructure.

It is the object of the present invention to provide a device of the type described in the foregoing which is inexpensive in manufacture and which is suitable for simplified and low cost assembly.

SUMMARY OF THE INVENTION

In accordance with the invention, this object is achieved in that the locking pawl with the pulling means, as well as the handle, are incorporated in the locking assembly, and in that the recipient means is a simple opening in the vehicle substructure or the vehicle body.

This arrangement enables a significant structural simplification of the device and reduces assembly time and costs. One particular advantage is that the locking assembly can be connected to the seat portion prior to final assembly. The only operation required on the assembly line is that of inserting the seat portion with its locking assemblies into the recipient means provided on the vehicle substructure, so that no fastening or bolting operations are necessary when the seat portion is installed into the vehicle. The recipient means for the locking assemblies is nothing more than simple apertures in the vehicle substructure, and the costs for their manufacture is negligible. Another significant advantage of the present invention is that after the removal of a seat portion with the help of the device according to the invention, there are no fastening components for the seat portions to protrude from the vehicle substructure which may cause articles transported in the vehicle to be damaged, or which may be damaged by such articles.

For the sake of simplicity, the invention proposes that the locking assembly be comprised of a pair of half-shell members which are arranged so as to enclose a U-shaped portion of the wire frame.

The half-shell members of the locking assemblies may be placed, in a simple manner, from two sides over the U-shaped wire frame portion if there is provided in at least one half-shell member a U-shaped groove which is open at the top and which is adapted to receive the U-shaped wire frame portion. The provision of this U-shaped groove will provide that after the two shell halves are joined to each other, the locking assembly is solidly connected to the seat portion.

According to another arrangement, one half-shell member of the locking assembly can be retained on the U-shaped wire frame portion by itself if that half-shell member has on its upper side an opening which permits insertion of the U-shaped wire frame portion, and if the half-shell member increases in thickness towards the bottom, so that the groove towards the base of the U extends progressively deeper into the lateral surfaces of the half-shell members, whereas the other half-shell member of the locking assembly is wedge-shaped and diminishes in thickness towards the bottom. This arrangement facilitates the procedure of installing the locking assembly to the wire frame.

The locking assembly can be installed rapidly and without tools if the half-shell members are connected to each other by clips.

The expenditure for the clips can be markedly reduced if the one half-shell member of the locking assembly has a pair of locking feet on its lower side which engage into corresponding openings on the other half shell member of the locking assembly, and if the one half-shell member is provided on its upper side with a tongue-shaped member which is adapted to lockingly engage into a corresponding opening provided on the other half-shell member. This arrangement is advantageously complimented by the aforementioned wedge-like shape of the two half-shell members.

Preferably, the locking pawl and one of the half-shell members are combined so as to form one single component. This is accomplished in that the locking pawl is a resilient, upwardly directed tongue-shaped member which is formed onto the lower portion of one of the half-shell members, and in that it is provided at its free end with the pull-type actuating member.

Due to manufacturing tolerances, the distance between the locking assembly and the recipient means is not always the same. However, these differences in height do not pose a problem if, in accordance with another feature of the invention, the locking assembly is provided with a plurality of locking projections which are arranged at different levels and which are adapted to enter into locking engagement with the recipient member.

The locking assembly is laterally guided and secured against lateral displacement by a pair of jaw-like members which are part of the half-shell members and which are arranged to envelop the locking element from the side.

The entire locking assembly, including the half-shell members, can be made as a single component in that the half-shell members are interconnected by way of a film-type hinge. This arrangement will provide that during installation a pair of half-shell members are automatically retained together as a unit.

It should be appreciated that a variety of arrangements may be utilized in the practice of the invention. One exemplary embodiment incorporating the basic principle of the invention is illustrated in the attached drawings and described in the following specifications.

DESCRIPTION OF THE PREFERRED EMBODIMENT

Figure 1:
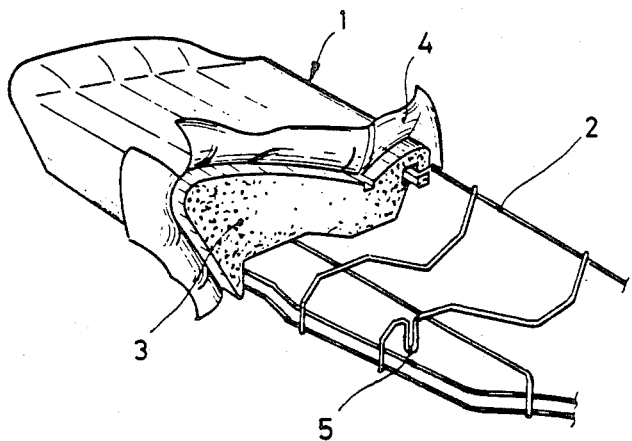
FIG. 1 is a three-dimensional view of a seat portion, part of the seat portion being illustrated without upholstery and seat covering.
Figure 2:
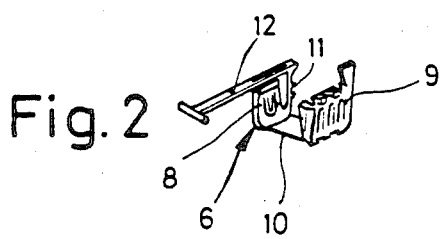
FIG. 2 is a three-dimensional view of a locking assembly which is used for locking the seat portion to the vehicle substructure.

In FIG. 1, a seat bottom 1, which is part of a motor vehicle rear seat, includes a wire frame 2 with foam rubber upholstery 3 and an outer cover 4. One feature which is relevant to the invention is that the wire frame 2 has at least one, but preferably two downwardly directed U-shaped portions 5 to which a respective locking assembly 6, which is illustrated in FIG. 2, is to be fastened. This locking assembly 6 serves as a means for releasably connecting the seat portion 1 to a vehicle substructure 7 illustrated in FIG. 3.

As apparent from FIG. 2, the locking assembly 6 is comprised of a pair of molded plastic half-shell members 8 and 9 which are molded together and integrally interconnected by means of a film-type hinge 10 providing a living plastic hinge therebetween and which in the installed position of the locking assembly 6 are adapted to engage the U-shaped portion 5 of the wire frame 2 from both sides in such a manner that the locking assembly 6 is fixedly secured to the wire frame 2. The latching assembly 6 includes a locking pawl 11 which is integrally and yielding molded to the half-shell member 8 and actuated by means of a pull-type actuating member 12 and which serves to lock the locking assembly 6 to the vehicle substructure 7.

Figure 3:
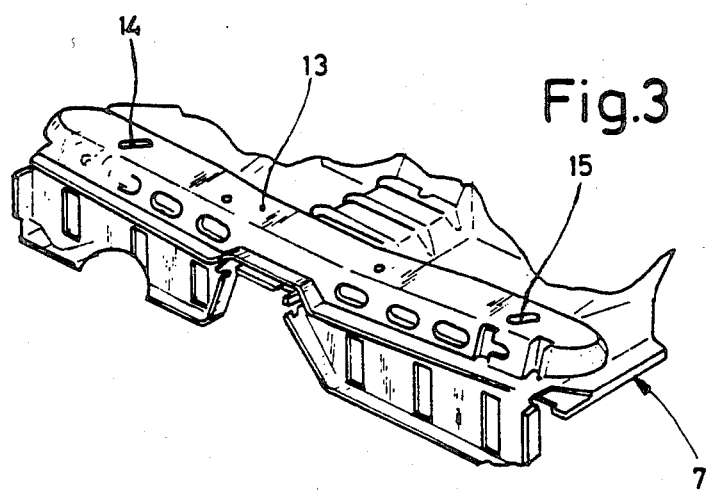
FIG. 3 is a three-dimensional view of the vehicle substructure portion which is to receive the seat portion.

The vehicle substructure 7 illustrated in FIG. 3 includes a conventional ramp 13 which serves as a support for the forward portion of the seat bottom 1. Ramp 13 is provided with laterally disposed openings 14 and 15. Openings 14 and 15 are in the form of oblong apertures and are adapted to receive one locking assembly 6 each. The locking assemblies 6 in the openings 14 and 15 are in locking engagement with the edges of the openings 14 and 15 by means of their respective pawls 11. By applying a pulling force to the pull type actuating members 12, the seat portion 1 can be unlocked from the vehicle substructure and can be removed therefrom.

Figure 4:
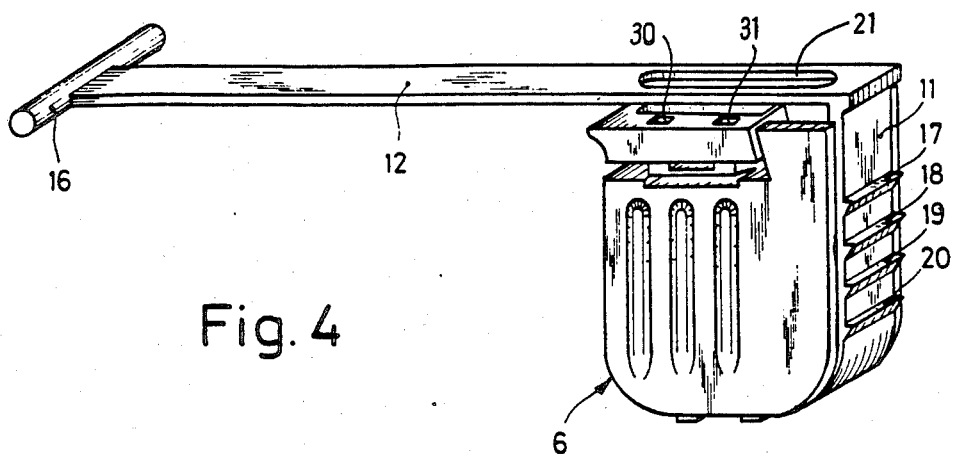
FIG. 4 is a three-dimensional view of the locking assembly according to FIG. 2, with the locking assembly being illustrated at an enlarged scale and in the closed position.

In FIG. 4 the locking assembly 6 is illustrated at an enlarged scale. It is apparent that the pull type actuating member 12 is integrally combined with the free end of the locking pawl 11 and that it is provided with an actuating handle 16. The locking pawl 11 has four locking projections 17, 18, 19, 20 which are arranged one above the other. Depending on how far the locking assembly 6 extends into the respective opening 14 or 15, one or the other of the locking projections 17–20 is caused to engage with the lower edge of the opening 14 and 15 so that the locking assembly 6 will be retained on the vehicle substructure 7. If a pulling force is exerted on the actuating rod 12, the locking projections 17–20 will, due to the pivoting movement of the locking pawl 11, move towards the left, as viewed in FIG. 4, and inside the body of the locking assembly 6 to effect unlocking of the same.

Figure 5:
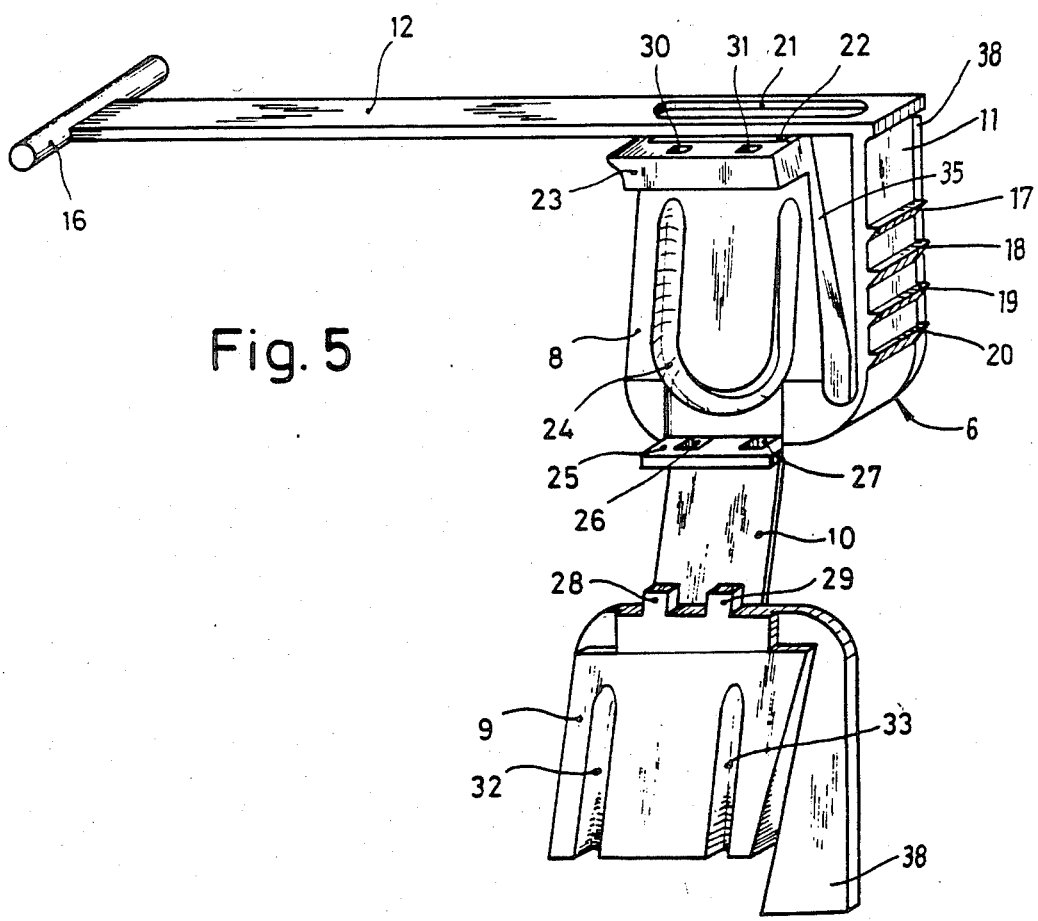
FIG. 5 is a three-dimensional view of the locking assembly in the open position.

FIG. 5 shows in part the inside of the two half-shell members 8 and 9. It is apparent that the pull type actuating means 12, as well as the upper side of the half-shell member 8 are provided, respectively, with oblong openings 21 and 22 through which the U-shaped portion 5 can be inserted into the half-shell member 8. Immediately below the upper surface 23, the inner surface of the half-shell member 8 is recessed, and as it extends downwardly, angles forwardly and assumes a wedge-like shape, i.e., the half-shell member 8 becomes progressively thicker towards the bottom. The inner surface of the half-shell member 8 is provided with an upwardly open U-shaped groove 24 which, due to the wedge-like configuration of the half-shell member 8, extends progressively deeper into the inner surface of the same.

At the lower end, the half-shell member 8 has a projection 25 with two openings 26 and 27 which are adapted to accommodate, respectively, the locking feet 28 and 29 of the other half-shell member 9. The upper side of the half-shell member 8 has two openings 30 and 31 for receiving tangs (not illustrated in FIG. 5) of the half-shell member 9 which are adapted to lockingly engage therein when the half-shell members 8 and 9, after insertion of the locking feet 28 and 29 into the openings 26 and 27, are folded together like a book.

In the open position illustrated in FIG. 5, the half-shell member 9 increases in thickness towards the bottom. Its inner surface is provided with two grooves 32 and 33 which are spaced apart at the same distance as the two legs of the U-shaped groove 24. If the U-shaped portion 5 is inserted from above through the openings 21 and 22 into the half-shell member 8 and is placed into the groove 24, it will be retained, after the half-shell members 8 and 9 are folded together, in the grooves, 24, 32 and 33.

Figure 6:
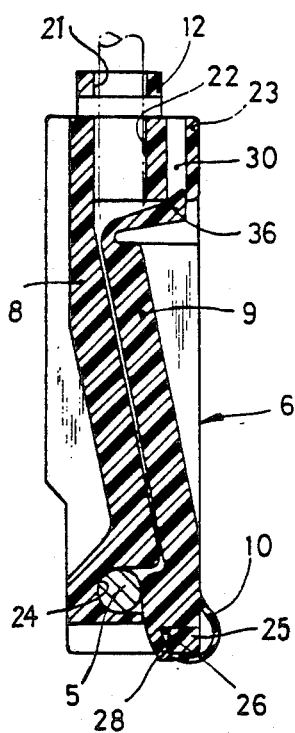
FIG. 6 is a side view of the locking assembly, partially illustrated in cross section.
Figure 7:
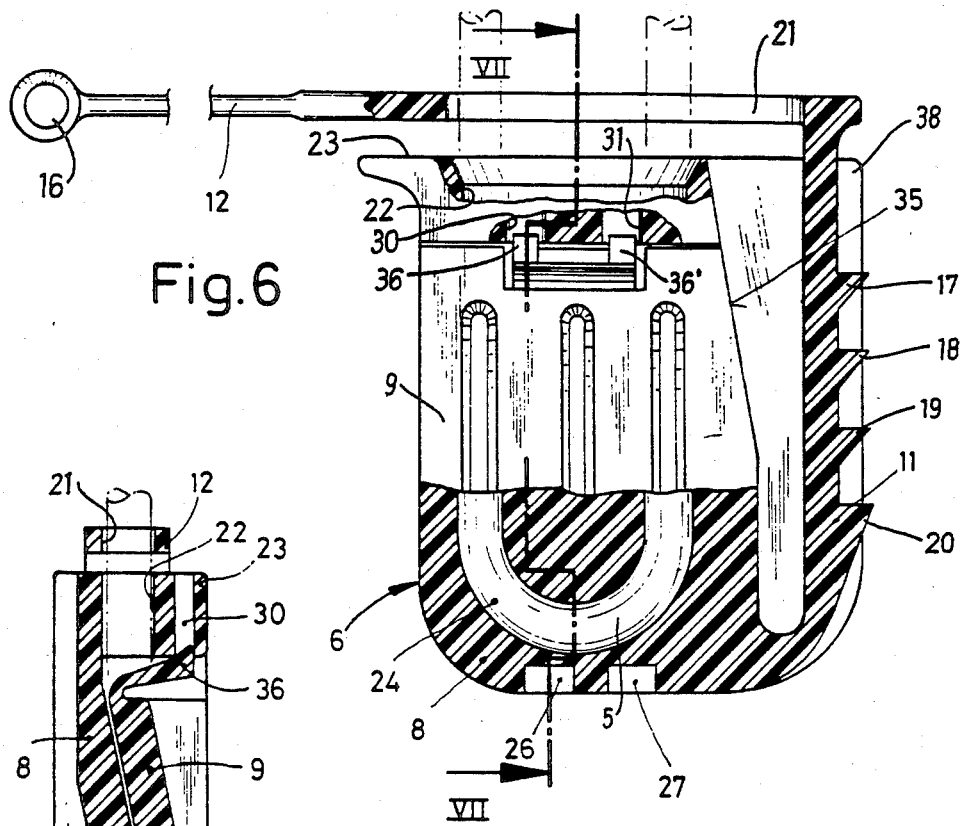
FIG. 7 is a longitudinal section through locking assembly along line VII—VII in FIG. 6.
Figure 8:
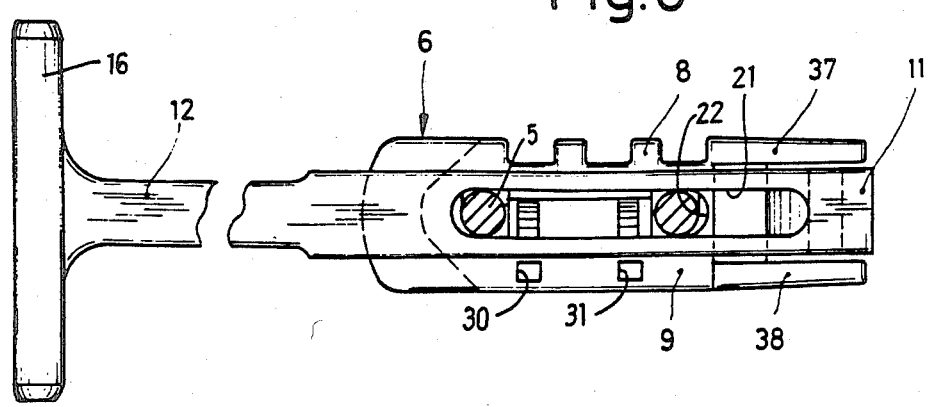
FIG. 8 a plan view of the locking assembly according to FIGS. 7 and 8.

FIGS. 6, 7 and 8 illustrate the locking assembly 6 with all essential details. As apparent from FIG. 6, the locking pawl 11 is a tongue-shaped member which is formed onto the lower portion of the half-shell member 8 and which has the actuating lever 12 secured to its upper end. The entire locking assembly 6 is made of a plastic material. This will facilitate the task of rendering the tongue-shaped locking pawl 11 flexible, so that this locking pawl, after having been deflected towards the left, relative to the view in FIG. 6, is able to recoil into the position illustrated in this figure.

The pull-type actuating member 12 is formed onto the free end of the locking pawl 11. A tapered surface 35 on the half-shell member 8 serves as a stop means to limit the pivoting movement of the locking pawl 11 during the unlocking operation of the same.

FIG. 7 illustrates the manner in which the half-shell members are locked to each other. It is apparent that the half-shell member 9 is interlocked with half-shell member 8 in that its locking foot 28 is in locking engagement with the opening 26 of the half-shell member 8. Likewise, locking foot 29, not shown in FIG. 7, is interlocked in the opening 27 of the half-shell member. The half-shell member 9 is provided on its upper portion with a transversely extending locking tongue 36 which is in locking engagement with the opening 30 of the half-shell member 8. A similar tongue 36' engages opening 31. FIG. 7 further illustrates the U-shaped portion 5 of the wire frame 2 and shows how it is clamped between the two half-shell members 8 and 9. Furthermore, one will note in FIG. 7 the film-type hinge 10 which serves as a means to interconnect the half-shell members 8 and 9.

In addition to that which is shown in the aforementioned figures, FIG. 8 illustrates how the locking pawl 11 is laterally embraced by a pair of arms 37 and 38. These arms 37 and 38 are lateral extensions of the half-shell members 8 and 9 and are designed to surround and prevent lateral displacement of the locking pawl 11.

The embodiments of the invention in which an exclusive property or privilege is claimed are defined as follows:

1. A device for releasably mounting the downward depending U-shaped bent portion of a wire seat frame on the apertured floor pan of a vehicle body, comprising:
   a pair of molded plastic half members having surfaces adapted for interengagement with one another and defining a mating groove configuration therebetween providing a U-shaped upwardly opening groove for enclosing the downwardly depending U-shaped bent portion of the wire seat frame therebetween when interengaged together,
   said half members having means acting therebetween to retain the half members in enclosure of the U-shaped bent portion of the seat frame,
   and a locking pawl integrally molded with one of the half members and adapted upon insertion of the half members and bent wire portion of the seat frame into the aperture of the floor pan to engage with the floor pan and retain the seat frame on the vehicle body.

2. The device of claim 1 further characterized by said integrally molded locking pawl being yieldable and having an actuating handle operable to disengage the locking pawl from the floor pan so that the seat is removable from the vehicle body.

3. The device of claim 2 further characterized by the locking pawl having a plurality of vertically spaced apart locking projections adapted for serial locking engagement with the floor pan.

4. The device of claim 2 further characterized by the half members having arms molded integrally therewith and extending laterally therefrom to surround the locking pawl and prevent lateral displacement of the locking pawl.

5. The device of claim 1 further characterized by the half members being integrally molded together and connected by a living plastic hinge enabling the half members to be folded into interengagement with one another to enclose the bent wire portion of the seat frame.

6. A device for releasably mounting the downward depending U-shaped bent portion of a wire seat frame on the apertured floor pan of a vehicle body, comprising:
   a pair of molded plastic half members having inner surfaces adapted for interengagement with one another and defining a mating groove configuration therebetween providing a U-shaped upwardly opening groove for enclosing the downwardly depending U-shaped bent portion of the wire seat frame therebetween when interengaged together, one of the half members progressively increasing in thickness towards the bottom, so that the groove configuration extends progressively deeper into the the inner surface of the one half member in the direction toward the base of the U-shaped groove, and the other of the half members progressively decreases in thickness towards the bottom so that the groove configuration extends progressively less deep into the inner surface of that half member in the direction toward the base of the U-shaped groove,
   said half members having integral molded means acting therebetween to retain the half members in enclosure of the U-shaped bent portion of the seat frame,
   and a locking pawl integrally molded with one of the half members and adapted upon insertion of the half members and bent wire portion of the seat frame into the aperture of the floor pan to engage with the floor pan and retain the seat frame on the vehicle body.

7. A device for releasably mounting the downward depending U-shaped bent portion of a wire seat frame on the apertured floor pan of a vehicle body, comprising:
   a pair of molded plastic half members having surfaces adapted for interengagement with one another and defining a mating groove configuration therebetween providing a U-shaped upwardly opening groove for enclosing the downwardly depending U-shaped bent portion of the wire seat frame therebetween when interengaged together,
   said half members having integral molded means acting therebetween to retain the half members in enclosure of the U-shaped bent portion of the seat frame and including locking feet provided at the base of one of the half member adapted for insertion into corresponding openings provided at the base of the other of the half members, and further including a locking tongue provided on the one of the half members at the end opposite the base thereof and adapted for locking insertion into a locking opening provided in the other half member,
   and a locking pawl integrally molded with one of the half members and adapted upon insertion of the half members and bent wire portion of the seat frame into the aperture of the floor pan to engage with the floor pan and retain the seat frame on the vehicle body.

* * * * *